(12) United States Patent
Gauthier et al.

(10) Patent No.: US 6,270,303 B1
(45) Date of Patent: *Aug. 7, 2001

(54) ANCHOR BOLT WITH A BEVELLED TOOTH EXPANSION CORE TO REDUCE FRICTION

(75) Inventors: Alain Gauthier, Saint Jean de Muzols; Jean-Paul Barthomeuf, Bourg de Peage, both of (FR)

(73) Assignee: Societe de Prospection et d'Inventions Techniques Spit, Bourg-les-Valence (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,677

(22) Filed: Mar. 16, 1999

(30) Foreign Application Priority Data

Mar. 16, 1998 (FR) .................................................. 98 03176

(51) Int. Cl.⁷ ..................................................... F16B 13/06

(52) U.S. Cl. .......................... 411/60.1; 411/60.3; 411/61

(58) Field of Search ................................ 411/60.1, 52.1, 411/61, 60.3, 63, 71, 74

(56) References Cited

U.S. PATENT DOCUMENTS

| 4,609,316 | * | 9/1986 | Oettl ........................................ 411/61 |
| 4,648,767 | * | 3/1987 | Fischer ................................. 411/60.1 |
| 4,904,135 | * | 2/1990 | Barthomeuf ........................... 411/61 |
| 4,968,200 | * | 11/1990 | Mark ..................................... 411/60.1 |
| 5,176,481 | * | 1/1993 | Schiefer ............................... 411/60.1 |
| 5,314,278 | * | 5/1994 | Weber .................................... 411/61 |
| 5,419,664 | * | 5/1995 | Hengesbach .......................... 411/61 |
| 5,458,448 | * | 10/1995 | Cheng ................................. 411/60.1 |

FOREIGN PATENT DOCUMENTS

| 42 20 300 | 12/1993 | (DE) . |
| 0 365 477 | 4/1990 | (EP) . |
| 0 524 137 | 1/1993 | (EP) . |
| 1 353 559 | 5/1974 | (GB) . |

* cited by examiner

Primary Examiner—Flemming Saether
(74) Attorney, Agent, or Firm—Lowe Hauptman Gilman & Berner, LLP

(57) ABSTRACT

An anchor bolt comprises a fixing rod (1), an expandable sleeve (2) and an expansion core (3) integral in translation with the fixing rod (1), intended to expand the sleeve (2). The sleeve (2) has a plurality of slots (9,9') widening towards the free end of the sleeve (2), forming a plurality of expansion teeth (18–20) cooperating with the expansion core (3). The inner wall of the edge of the teeth (18–20) is blunt and the thickness of each tooth is bevelled to decrease towards the free end of the sleeve.

6 Claims, 1 Drawing Sheet

ANCHOR BOLT WITH A BEVELLED TOOTH EXPANSION CORE TO REDUCE FRICTION

TECHNICAL FIELD

The invention relates to an anchor bolt with an expansion core intended to be introduced and anchored into a material, e.g. a wall, in order to fix an article thereto.

BACKGROUND ART

The invention relates more particularly to an anchor bolt of a type comprising a fixing rod, an expandable sleeve and an expansion core integral in translation with the fixing rod, intended to expand the sleeve, the sleeve making at least one slot widening towards a free end of the sleeve, thereby forming at least one expansion tooth cooperating with the core. The expansion tooth is designed to decrease the pressures being exerted on the sleeve during expansion, thus making expansion easier.

With bolts of this type, there is a risk that the inner edge of the tooth or teeth of the expandable sleeve will be anchored in the expansion core, thereby damaging it and impeding the translation thereof toward the exterior of a locating hole for the bolt. The operator then has to use great force in order to free the expansion core and anchor the bolt.

SUMMARY OF THE INVENTION

The invention aims to obviate this disadvantage.

To this end, the invention relates to a bolt of the type defined hereinabove, characterised in that the inner wall of the edge of the expansion tooth is blunt.

The thickness of the tooth advantageously decreases towards the free end of the sleeve.

The expansion of the sleeve is consequently made easier.

The sleeve advantageously comprises one anti-rotation stamped boss.

Thus, the contact surface between the sleeve and the expansion core is less. important. Consequently, the friction between the sleeve and the expansion core is decreased, which makes easier the relative movement of the core and the sleeve.

BRIEF DESCRIPTION OF THE DRAWINGS

The invention will be more readily understood with the aid of the following description of one particular embodiment of the anchor bolt of the invention with reference to the accompanying drawings, in which.

BEST MADE FOR CARRYING OUT THE INVENTION

Figure 1:
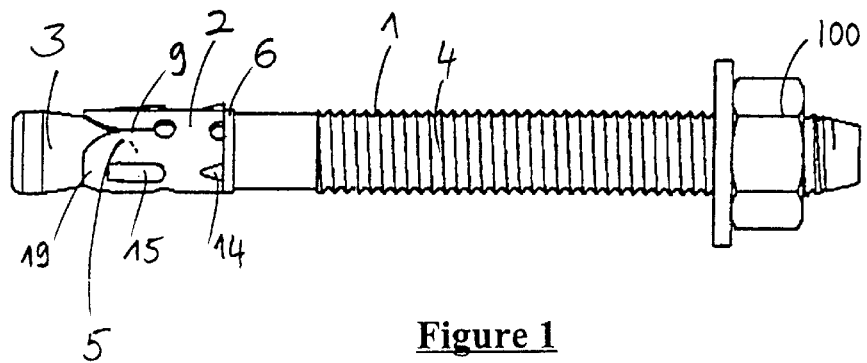
FIG. 1, is a side view of the anchor bolt according to the particular embodiment of the invention.
Figure 2:
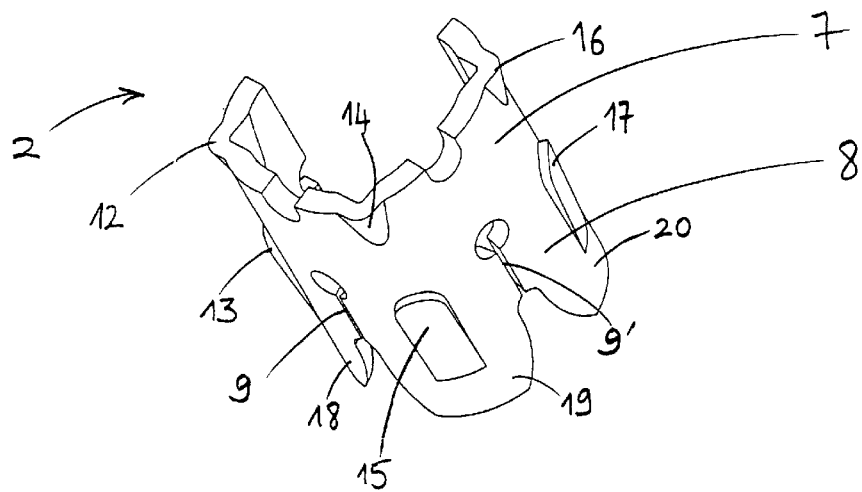
FIG. 2 is a perspective view of an expandable sleeve of the bolt of FIG. 1.
Figure 3:
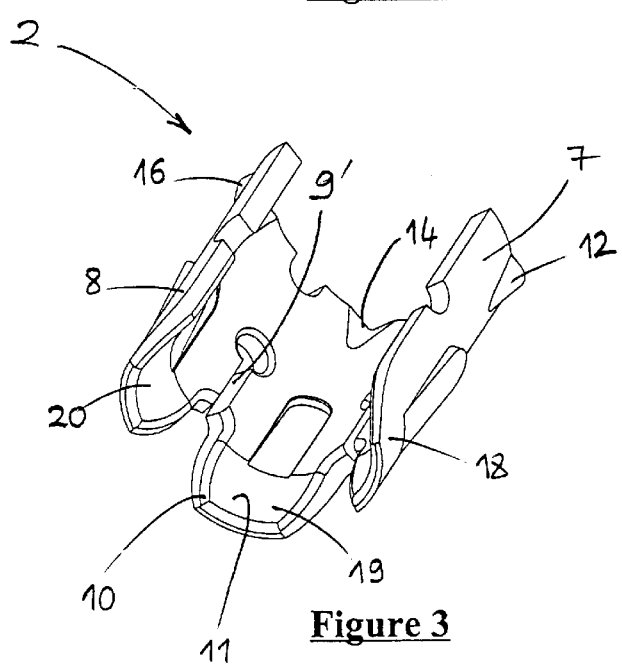
FIG. 3 is another perspective view of the expandable sleeve of FIG.

The anchor bolt comprises a fixing rod 1, an expandable sleeve 2 and an expansion core 3, in this case in the form of a truncated cone.

The fixing rod 1 comprises a fixing portion 4 provided with an external thread and an expansion portion 5 adjacent the fixing portion 4 along the axis of the rod 1. The expansion portion 5 is integral at its end opposite the end at which it is connected to the fixing portion 4 with the expansion cone 3 which widens out towards the free end of the rod 1. The rod 1 is therefore integral in translation with the expansion core 3. A shoulder 6, constituting a stop for the sleeve 2, is located between the fixing portion 4 and the expansion portion 5.

The expandable sleeve 2 is mounted around the expansion portion 5 and is held in-position between the expansion cone 3 and the shoulder 6.

The sleeve 2, which is open (i.e. not completely closed, rolled up), in this case comprises a non-slotted part 7 and an anchoring part 8 adjacent to the non-slotted part 7 along the axis of the sleeve.

In this case, the anchoring part 8 forms two anchoring slots 9, 9' of substantially zero width close to the non-slotted part 7 and widening towards the free end of the anchoring part 8 of the sleeve 2, thereby forming three expansion teeth 18–20, cooperating with the expansion cone 3. The widening of the slots 9, 9' allows for a reduction in the pressures supported by the anchoring part 8 of the sleeve 2 during expansion. The expansion teeth 18–20 are intended to make easier the expansion of the sleeve 2.

The anchoring part 8 comprises three anti-rotation bosses 13, 15, 17, intended to prevent rotation of the bolt. The bosses 13, 15, 17 are generally rectangular and formned by stamping the wall of the sleeve 2.

The non-slotted part 7 also comprises three anti-rotation stamped bosses 12, 14, 16, located adjustment the end of the non-slotted part.

The inner wall 10 of the edge of each tooth 18–20 is berelled. In other words, the perimeter of each tooth 18–20 is rounded, on the inner side of the sleeve 2. Consequently, the sleeve 2 does not damage the expansion core 3. Furthermore, the thickness of the wall 11 of the expansion teeth 18–20 decreases towards the free end of the anchoring part 8, the inner surface of the wall 11 of the teeth 18–20 widening out continuously towards the free end.

To anchor the bolt in a support, a hole into which the anchor bolt is introduced is drilled in the support in advance. A nut 100 is then screwed on to the fixing portion 4 of the rod 1. The bosses 12–17 anchor in the wall of the hole and thus prevent rotation of the bolt in a known manner, such that the action of screwing the nut 100 guides the fixing rod 1 in translation towards the exterior of the hole and the expansion cone 3 expands the sleeve 2, which is anchored in the support.

What is claimed is:

1. An anchor bolt, comprising a fixing rod (1), an expandable sleeve (2) mounted on the fixing rod (1) and an expansion core (3) integral with the fixing rod (1) and moveable therewith to expand the sleeve (2), said sleeve (2) including at least one slot (9,9') with a portion thereof widening towards a free end of the sleeve (2) and thereby forming at least one expansion tooth (18–20) contactable with the expansion core (3), wherein an edge (10) of an entire inner peripheral wall (11) of the tooth (18–20) from the widening portion of the slot terminating at the free end is bevelled and a thickness of the tooth (18–20) decreases towards said free end of the sleeve (2).

2. Bolt according to claim 1, wherein the sleeve (2) comprises at least one anti-rotation stamped boss (13,15,17).

3. Bolt according to claim 2, wherein the anti-rotation boss (13,15,17) is generally rectangular.

4. The anchor bolt of claim 1, further comprising a plurality of said teeth.

5. The anchor bolt of claim 4, wherein said plurality of teeth includes three teeth.

6. The anchor bolt of claim 1, wherein said entire inner peripheral wall includes entire walls of the tooth defined by said at least one slot.

* * * * *